(12) United States Patent
Hayashida

(10) Patent No.: US 9,430,006 B1
(45) Date of Patent: Aug. 30, 2016

(54) COMPUTING DEVICE WITH HEAT SPREADER

(71) Applicant: GOOGLE INC., Mountain View, CA (US)

(72) Inventor: Jeffrey Hayashida, San Francisco, CA (US)

(73) Assignee: Google Inc., Mountain View, CA (US)

( * ) Notice: Subject to any disclaimer, the term of this patent is extended or adjusted under 35 U.S.C. 154(b) by 218 days.

(21) Appl. No.: 14/041,483

(22) Filed: Sep. 30, 2013

(51) Int. Cl.
*G06F 1/20* (2006.01)

(52) U.S. Cl.
CPC ............................ *G06F 1/20* (2013.01)

(58) Field of Classification Search
CPC .................. G06F 1/20; G06F 1/203
USPC .............. 361/679.08, 679.09, 688
See application file for complete search history.

(56) References Cited

U.S. PATENT DOCUMENTS

| | | |
|---|---|---|
| 3,586,102 A | 6/1971 | Gilles |
| 3,741,292 A | 6/1973 | Aakalu et al. |
| 4,092,697 A | 5/1978 | Spaight |
| 4,155,402 A | 5/1979 | Just |
| 4,262,045 A | 4/1981 | Cheng et al. |
| 4,284,674 A | 8/1981 | Sheptak |
| 4,563,375 A | 1/1986 | Ulrich |
| 4,618,517 A | 10/1986 | Simko, Jr. |
| 4,636,416 A | 1/1987 | Kratel et al. |
| 4,669,632 A | 6/1987 | Kawasaki et al. |
| 4,823,863 A | 4/1989 | Nakajima et al. |
| 4,825,089 A | 4/1989 | Lindsay |
| 4,997,032 A | 3/1991 | Danielson et al. |
| 5,018,328 A | 5/1991 | Cur et al. |
| 5,107,649 A | 4/1992 | Benson et al. |
| 5,270,092 A | 12/1993 | Griffith et al. |
| 5,379,183 A | 1/1995 | Okonsky et al. |
| 5,661,637 A * | 8/1997 | Villaume ................. 361/679.47 |
| 5,792,539 A | 8/1998 | Hunter |
| 5,981,085 A | 11/1999 | Ninomiya et al. |
| 6,037,033 A | 3/2000 | Hunter |
| 6,055,155 A | 4/2000 | von Gutfeld |

(Continued)

FOREIGN PATENT DOCUMENTS

| | | |
|---|---|---|
| EP | 515664 B1 | 3/1999 |
| EP | 1145074 B1 | 9/2002 |

(Continued)

OTHER PUBLICATIONS

International Search Report and Written Opinion for International Application No. PCT/US2014/058388, mailed Jan. 5, 2015, 14 pages.

(Continued)

*Primary Examiner* — Tuan T Dinh
*Assistant Examiner* — Mukund G Patel
(74) *Attorney, Agent, or Firm* — Brake Hughes Bellermann LLP

(57) ABSTRACT

The computing device includes an enclosure including a first structure, a second structure aligned parallel to the first structure and a third structure disposed between the first structure and the second structure, the third structure including a thermally non-conductive material, a heat generating element in contact with the third structure, and a flexible sheet in contact with the heat generating element and the second structure, the flexible sheet configured to conduct heat generated by the heat generating element away from the first structure and to a surface of the second structure.

18 Claims, 10 Drawing Sheets

(56) References Cited

U.S. PATENT DOCUMENTS

| | | | |
|---|---|---|---|
| 6,055,156 A | 4/2000 | von Gutfeld | |
| 6,269,864 B1 | 8/2001 | Kabadi | |
| 6,333,847 B1 | 12/2001 | Katsui et al. | |
| 6,358,595 B1 | 3/2002 | Kobayashi | |
| 6,418,017 B1 | 7/2002 | Patel et al. | |
| 6,459,591 B2 | 10/2002 | Liu | |
| 6,801,268 B2 | 10/2004 | Huang et al. | |
| 6,809,413 B1 | 10/2004 | Peterson et al. | |
| 6,826,040 B2 | 11/2004 | Wang | |
| 6,859,364 B2 | 2/2005 | Yuasa et al. | |
| 7,161,809 B2 | 1/2007 | Ford et al. | |
| 7,292,441 B2 | 11/2007 | Smalc et al. | |
| 7,345,885 B2 * | 3/2008 | Boudreaux | H05K 1/144 165/185 |
| 7,349,040 B2 | 3/2008 | Lee et al. | |
| 7,545,644 B2 | 6/2009 | Fedorov | |
| 7,626,807 B2 | 12/2009 | Hsu | |
| 7,729,108 B2 | 6/2010 | Rehmann et al. | |
| 7,869,205 B2 | 1/2011 | Chin | |
| 7,960,913 B2 | 6/2011 | Yee et al. | |
| 8,000,103 B2 | 8/2011 | Lipp et al. | |
| 8,089,758 B2 | 1/2012 | Zhu et al. | |
| 8,092,908 B2 | 1/2012 | Ohta et al. | |
| 8,120,915 B2 | 2/2012 | Pautsch et al. | |
| 8,174,828 B2 | 5/2012 | Tilton et al. | |
| 8,199,469 B2 | 6/2012 | Coish et al. | |
| 8,227,729 B2 | 7/2012 | Sorabji et al. | |
| 8,270,914 B2 | 9/2012 | Pascolini et al. | |
| 8,339,775 B2 | 12/2012 | Degner et al. | |
| 8,350,984 B2 | 1/2013 | Perry et al. | |
| 8,372,495 B2 | 2/2013 | Kenney | |
| 8,374,378 B2 | 2/2013 | Hopkinson et al. | |
| 8,432,509 B2 | 4/2013 | Bergeron et al. | |
| 8,437,125 B2 | 5/2013 | Jørgensen et al. | |
| 8,465,864 B1 * | 6/2013 | Kwak et al. | 429/120 |
| 8,861,191 B1 | 10/2014 | Yu et al. | |
| 2003/0043541 A1 | 3/2003 | Yuasa et al. | |
| 2003/0157284 A1 | 8/2003 | Tanimoto et al. | |
| 2004/0120103 A1 | 6/2004 | Wang | |
| 2005/0100728 A1 | 5/2005 | Ristic-Lehmann et al. | |
| 2005/0270746 A1 | 12/2005 | Reis | |
| 2006/0164802 A1 | 7/2006 | Chen | |
| 2007/0115635 A1 | 5/2007 | Low et al. | |
| 2007/0279848 A1 | 12/2007 | Lin et al. | |
| 2008/0112119 A1 | 5/2008 | Wang et al. | |
| 2009/0154113 A1 | 6/2009 | MacDonald | |
| 2009/0155646 A1 | 6/2009 | Endo et al. | |
| 2010/0009174 A1 * | 1/2010 | Reis | 428/332 |
| 2010/0012171 A1 * | 1/2010 | Ammar | 136/246 |
| 2010/0028649 A1 | 2/2010 | Trouilhet et al. | |
| 2010/0083417 A1 | 4/2010 | Alder et al. | |
| 2010/0218932 A1 | 9/2010 | Fischer et al. | |
| 2010/0263540 A1 | 10/2010 | Hashida et al. | |
| 2011/0043995 A1 | 2/2011 | Chen et al. | |
| 2011/0059275 A1 | 3/2011 | Stark | |
| 2011/0242757 A1 | 10/2011 | Tracy et al. | |
| 2011/0247781 A1 | 10/2011 | Vafai et al. | |
| 2011/0296771 A1 | 12/2011 | Miller et al. | |
| 2013/0009828 A1 | 1/2013 | Pascolini et al. | |
| 2013/0009898 A1 | 1/2013 | Mathew et al. | |
| 2013/0016050 A1 | 1/2013 | Allore et al. | |
| 2013/0037228 A1 | 2/2013 | Verschoor et al. | |
| 2013/0070399 A1 | 3/2013 | Liu et al. | |
| 2013/0093657 A1 | 4/2013 | Song et al. | |
| 2013/0189022 A1 | 7/2013 | Elliot et al. | |
| 2014/0043744 A1 | 2/2014 | Matsuoka et al. | |
| 2014/0118927 A1 | 5/2014 | Hamburgen | |
| 2015/0092332 A1 | 4/2015 | Yu et al. | |

FOREIGN PATENT DOCUMENTS

| | | |
|---|---|---|
| EP | 1378926 A2 | 1/2004 |
| EP | 1519217 A1 | 3/2005 |
| EP | 1754993 B1 | 12/2008 |
| EP | 1620953 B1 | 4/2009 |
| EP | 2154109 A1 | 2/2010 |
| WO | 03001133 A2 | 1/2003 |
| WO | 2005048298 A2 | 5/2005 |
| WO | 2006033808 A2 | 3/2006 |
| WO | 2006132695 A2 | 12/2006 |
| WO | 2010005435 A1 | 1/2010 |
| WO | 2015/048772 A1 | 4/2015 |

OTHER PUBLICATIONS

International Search Report and Written Opinion for PCT Patent Application No. PCT/US2013/065961, mailed on Feb. 14, 2014, 11 pages.

Cabot, "Aerogel", retrieved on Jan. 8, 2013 from www.cabot-corp.com/Aerogel, 3 pages.

Cabot, "Cabot Corporation's Enova® Aerogel Enables New Aerolon Thermal Insulation Coatings", Apr. 30, 2012, 3 pages.

Cabot, "Coatings", retrieved on Jan. 8, 2013 from www.cabot-corp.com/aerogel/coatings, 2 pages.

"Insulated glazing", from Wikipedia, the free encyclopedia, retrieved on Jan. 8, 2013, 7 pages.

Tnemec, "Meet the Next Generation of Thermal Insulation Coatings", retrieved on Jan. 8, 2013 from https://www.tnemec.com/news/AerolonRelease.aspx, 4 pages.

"Thermal Conductivity of Gases", Engineers Edge, retrieved on Jan. 8, 2013 from www.engineersedge.com/heat_transfer/thermal-conductivity-gases.htm, 2 pages.

CABOT Aerogel, "Thermal Wrap TW350, 600, 800", Product Features, 2011, 1 page.

Griffith et al., "Gas-Filled Panels: An Update on Applications in the Building Thermal Envelope", Proceedings of the BETEC Fall Symposium, Nov. 14, 1995, 14 pages.

Kohler, Christian, "Gas Filled Panels", retrieved on Jan. 8, 2013 from gfp.lbl.gov/default.htm, 1 page.

* cited by examiner

COMPUTING DEVICE WITH HEAT SPREADER

FIELD

Embodiments relate to heat dissipation in computing devices.

BACKGROUND

As capabilities of computing devices increase and the size of components of the computing devices decrease, the heat generation of the components typically increases. For example, as processing speeds of central processing units (CPU) increase to higher frequencies and, at the same time, decrease in size, relatively extreme temperatures can be generated by the CPU. With the increase in heat generation in computing devices, hot spots, that is, localized high temperature areas, have become an issue.

For example, the increasing desire for smaller and more compact computing devices, such as laptop computers, has resulted in a heat source (e.g., a hard drive, CPU, graphics chip, inverter/converter, memory chips, and the like) being adjacent to one or more external surfaces of the computing device. As such, external surfaces of the device can become heated, which can be uncomfortable or even dangerous to a user of the computing device. In addition, computing components that operate at high temperatures can damage and/or decrease the effectiveness of adjacent computing components For example, heat-generating components can cause the bottom of a laptop computer to become heated. The heated laptop can cause discomfort or even pain to the user when the laptop is positioned in the user's lap. This has become a significant problem for makers of laptop computers, and other portable devices where there is a continuing effort to make the devices smaller for greater portability. As a result, there is a need for mechanisms to disperse heat generated by a heat-generating component away from localized hot spots.

SUMMARY

One embodiment includes a computing device. The computing device includes an enclosure including a first structure, a second structure aligned parallel to the first structure and a third structure disposed between the first structure and the second structure, the third structure including a thermally non-conductive material, a heat generating element in contact with the third structure, and a flexible sheet in contact with the heat generating element and the second structure, the flexible sheet configured to conduct heat generated by the heat generating element away from the first structure and to a surface of the second structure.

Another embodiment includes a computing device. The computing device includes an enclosure including a first structure, a second structure aligned parallel to the first structure, a third structure disposed between the first structure and the second structure, the third structure including a thermally non-conductive material, and a fourth structure aligned substantially perpendicular to the first structure, a heat generating element in contact with the third structure, and a flexible sheet configured to conduct heat generated by the heat generating element away from the first structure and to a surface of the fourth structure configured to dissipate heat.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein.

Figure 1:
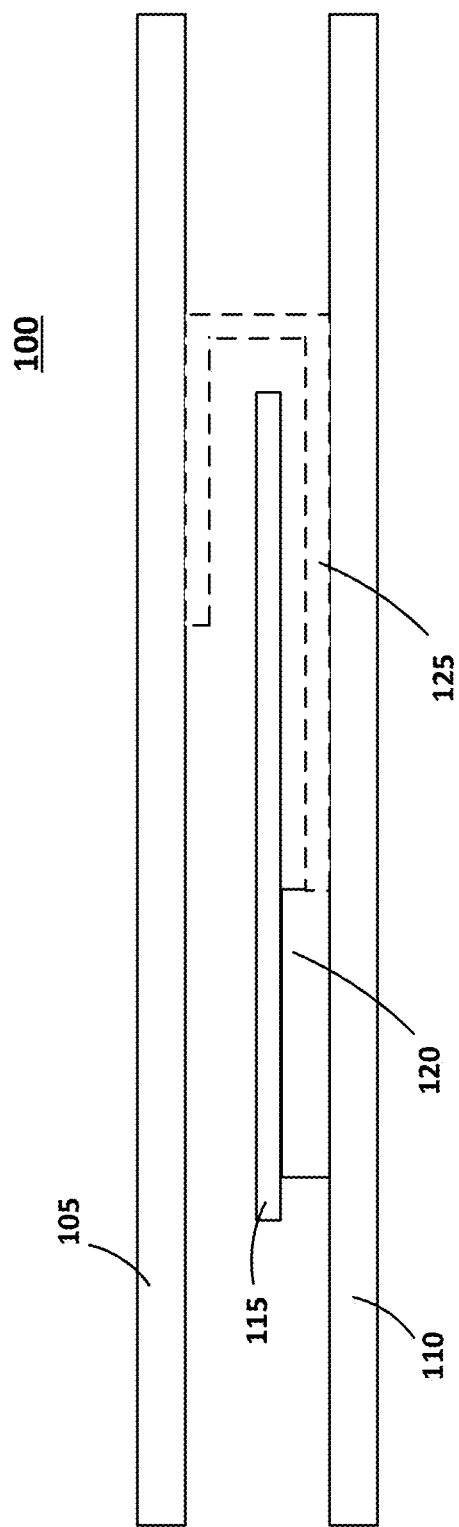
FIG. 1 illustrates a block diagram of a computing device including a heat spreader according to at least one example embodiment.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

According to example embodiments, a flexible, thermally conductive material (e.g., graphite) may be used to conduct heat away from a hotspot resulting from heat generated by a component (e.g., a processor) in a computing device.

FIG. 1 illustrates a block diagram of a computing device including a heat spreader according to at least one example embodiment. The computing device 100 includes a first structure 105, a second structure 110, a third structure 115, a heat generating element or component 120 and a heat spreader 125. The first structure 105 may be a frame, a circuit board, a heat sink, a base plate, and the like of the computing device 100. The second structure 110 may be a frame, a circuit board, a heat sink, a base plate, and the like of the computing device 100. The third structure 115 may be a frame, a circuit board, a heat sink, and the like of the computing device 100.

The first structure 105, the second structure 110 and the third structure 115 may be dimensionally longer and/or shorter with regard to each other. For example, the heat spreader 125 is shown as extending out and around the third structure 115. However, the third structure 115 may be relatively shorter than shown such that the heat spreader 125 extends relatively straight (e.g., perpendicular) from the first structure 105 to the second structure 110. A length and/or width of the heat spreader 125 may be based on the dimensions of other components of the computing device (e.g., the third structure 115), a desired amount of heat transfer by the heat spreader 125, a desired position on the first structure 105 to transfer heat to by the heat spreader, and/or the like.

The first structure 105, the second structure 110 and the third structure 115 may be thermally isolated (or substantially thermally isolated) from each other or made of material having a relatively low thermal conductivity (e.g., a plastic, a ceramic, etc.). In other words, the first structure 105, the second structure 110, and/or the third structure 115 can be made of a material that is a thermal insulator. For example, heat generated on one of the structures (e.g., the second structure 110) may not be efficiently conducted to the other structures (e.g., the first structure 105 and the third structure 115) via any of the structures. In other words, heat associated with a hotspot on the second structure 110 may not be efficiently conducted away from the hotspot to the first structure 105 via the second structure 110.

Further, the first structure 105, the second structure 110 and/or the third structure 115 may be separated by an insulator. For example, first structure 105, the second structure 110 and the third structure 115 may be separated by air, plastic, a dielectric, and/or the like. Still further, as is shown in FIG. 1, the third structure 115 may be between the first structure 105 and the second structure 110. In this example, the third structure 115 may be constructed (or substantially constructed) of an insulating material (e.g., a plastic and/or a dielectric material) thus thermally isolating (or aiding in the thermal isolation of) the first structure 105 from the second structure 110.

The term thermally isolated (or substantially isolated) does not mean the absence of thermal conduction or complete insulation, but instead indicates that any thermal conduction that does occur is relatively inefficient (compared with a thermally conductive material) and likely will not substantially reduce the temperature at a hotspot by redirecting generated heat.

The heat generating element 120 may be, for example, a hard drive, CPU, graphics chip, inverter/converter, memory chips, and the like. The heat generating element 120 may generate a hotspot (e.g., a temperature hotspot) on the second structure 110. The heat spreader 125 may be configured to conduct heat generated by the heat generating element 120 away from the second structure 110 and to the first structure 105. In other words, the heat spreader 125, which may be made of a material having a relatively high thermal conductivity (compared with that of the structures 105, 110, 115), may be configured as an efficient heat transfer mechanism configured to reduce the heat at a hotspot generated by the heat generating element 120. The heat spreader 125 may be a flexible, thermally conductive material (e.g., graphite or thin sheet of aluminum). The first structure 105 may be configured to dissipate the heat conducted to the first structure 105 by the heat spreader 125.

FIGS. 2A-2F illustrate block diagrams of configurations of a heat spreader according to at least one example embodiment. As shown in FIGS. 2A-2D, the computing device 200 includes a first structure 205, a second structure 210, a third structure 215 a fourth structure 230, a heat generating element or component 220 and heat spreaders 225-1 to 225-4. The fourth structure 230 may be a frame, a heat sink, a back bone, and the like of the computing device. The first structure 205, the second structure 210, the third structure 215 and the fourth structure 230 may be thermally isolated (or substantially isolated) from each other (as discussed further above).

The first structure 205, the second structure 210 and the third structure 215 may be aligned parallel and/or substantially parallel to each other. As is shown in FIG. 1, the third structure 215 may be positioned between the first structure 205 and the second structure 210. The first structure 205, the second structure 210 and the third structure 215 may be aligned perpendicular and/or substantially perpendicular to the fourth structure 230.

The heat spreaders 225-1 to 225-4 may be a flexible, thermally conductive material (e.g., graphite or thin sheet of aluminum). For example, the heat spreaders 225-1 to 225-4 may be formed and/or bent into multiple shapes (e.g., bent at an angle) without breaking. The first structure 205 may be configured to dissipate the heat conducted to the first structure 205 by the heat spreaders 225-1 to 225-4. For example, the heat spreaders 225-1 to 225-4 may be a flexible, thermally conductive sheet of woven graphite strands. For example, the heat spreaders 225-1 to 225-4 may be a flexible, thermally conductive sheet of bonded graphite fiber. For example, the heat spreaders 225-1 to 225-4 may be a flexible, thermally conductive sheet of bonded graphite flakes. For example, the heat spreaders 225-1 to 225-4 may be a flexible, sheet of thermally conductive metal (e.g., aluminum, copper or titanium). For example, the heat spreaders 225-1 to 225-4 may be a flexible, thermally conductive sheet of woven thermally conductive metal (e.g., aluminum, copper or titanium) strands. For example, the heat spreaders 225-1 to 225-4 may be a flexible, thermally conductive sheet of woven metal plated fiber strands.

Figure 2A:
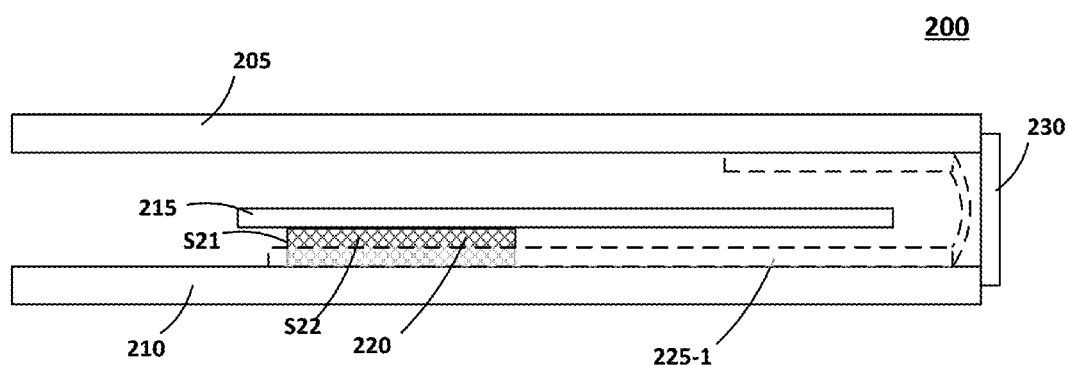
FIGS. 2A-2F illustrate block diagrams of configurations of a heat spreader according to at least one example embodiment.

As shown in FIG. 2A, the heat spreader 225-1 may surround the heat generating element 220 such that the heat spreader 225-1 is in contact with or coupled to (or substantially in contact with or coupled to) more than one side surface (e.g., S21 and S22) of the heat generating element 220. For example, if the heat generating element 220 is a rectangle, square, or cube the heat spreader 225-1 may be in contact with or coupled to (or substantially in contact with or coupled to) two or more sides of the heat generating element 220. For example, if the heat generating element 220 is a circle, oval or cylinder, the heat spreader 225-1 may be in contact with or coupled to (or substantially in contact with or coupled to) a significant portion of the circumference of the heat generating element 220. The heat spreader 225-1 may be coupled to the heat generating element 220, the first structure 205 and/or the second structure 210 using an adhesive (e.g., a thermally conductive glue/epoxy or thermally conductive tape) and/or a paste/grease (e.g., a thermally conductive paste/grease).

Figure 2B:
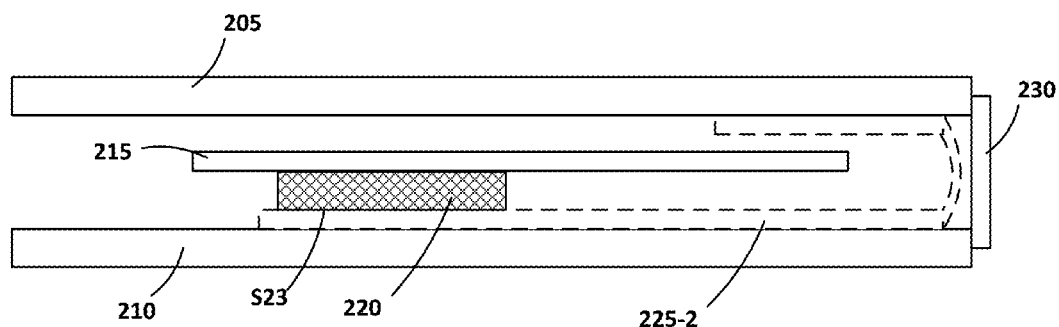

As shown in FIG. 2B, the heat spreader 225-2 may be disposed between the generating element 220 and a surface (e.g. S23) of the second structure 210 such that the heat spreader 225-2 is in contact with or coupled to (or substantially in contact with or coupled to) one surface (e.g., a bottom surface S23) of the heat generating element 220. The heat spreader 225-2 may be in contact with an entire surface (e.g., S23) of the heat generating element 220 or a portion of the surface (e.g., S23) of the heat generating element 220. The heat spreader 225-2 may be coupled to the heat generating element 220, the first structure 205 and/or the second structure 210 using an adhesive (e.g., a thermally conductive glue/epoxy or thermally conductive tape) and/or a paste/grease (e.g., a thermally conductive paste/grease).

Figure 2C:
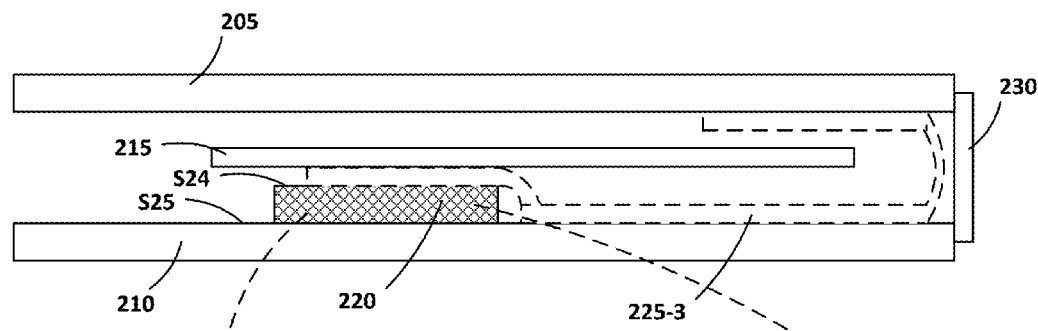
Figure 2E:
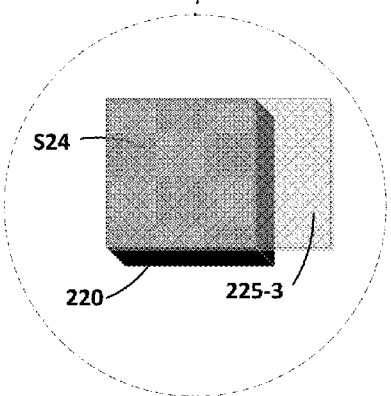
Figure 2F:
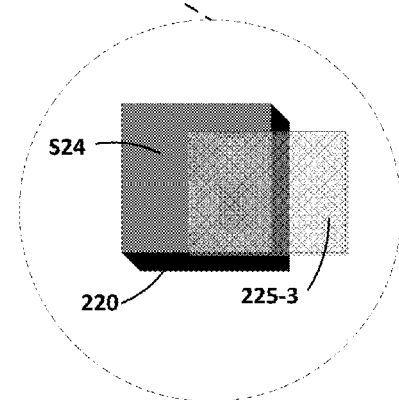

As shown in FIG. 2C, the heat spreader 225-3 may be on a surface (e.g., a top surface S24) of the generating element 220 that is opposite a surface (e.g., a top surface S25) of the second structure 210 such that the heat spreader 225-3 is in contact with or coupled to (or substantially in contact with or coupled to) one surface (e.g., a top surface S24) of the heat generating element 220. The heat spreader 225-3 may be in contact with an entire surface (e.g., S24) of the heat generating element 220, as shown in FIG. 2E, or a portion of the surface (e.g., S24) of the heat generating element 220, as shown in FIG. 2F. The heat spreader 225-3 may be coupled to the heat generating element 220, the first structure 205 and/or the second structure 210 using an adhesive (e.g., a thermally conductive glue/epoxy or thermally conductive tape) and/or a paste/grease (e.g., a thermally conductive paste/grease). The heat spreader 225-3 may traverse along (or substantially along) the second structure 210.

Figure 2D:
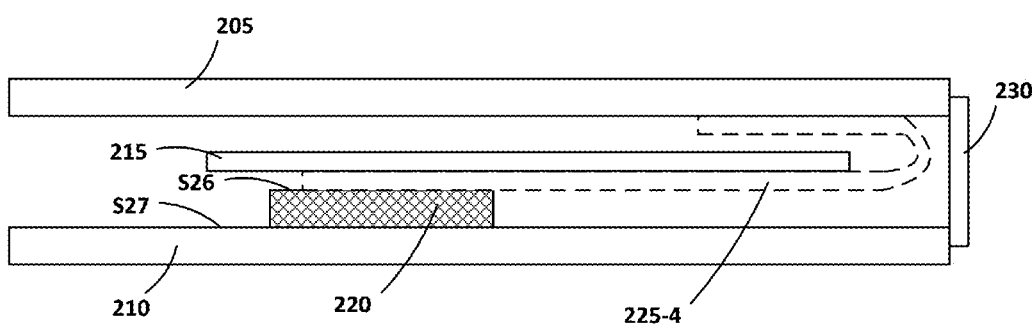

As shown in FIG. 2D, the heat spreader 225-4 may be on a surface (e.g., a top surface S26) of the generating element 220 that is opposite a surface (e.g., a top surface S27) of the second structure 210 such that the heat spreader 225-4 is in contact with or coupled to (or substantially in contact with or coupled to) one surface (e.g., a top surface S26) of the heat generating element 220. The heat spreader 225-4 may be in contact with an entire surface (e.g., S26) of the heat generating element 220 or a portion of the surface (e.g., S26) of the heat generating element 220. The heat spreader 225-4 may be coupled to the heat generating element 220, the first structure 205 and/or the third structure 215 using an adhesive (e.g., a thermally conductive glue/epoxy or thermally conductive tape) and/or a paste/grease (e.g., a thermally conductive paste/grease). The heat spreader 225-4 may traverse along (or substantially along) the third structure 215.

FIGS. 3A-3F illustrate block diagrams of further configurations of a heat spreader according to at least one example embodiment. As shown in FIGS. 3A-3D, the computing device 300 includes a first structure 305, a second structure 310, a third structure 315, a fourth structure 330, a heat generating element or component 320 and heat spreaders 325-1 to 325-4. The heat generating element 320 may generate a hotspot on the second structure 310. The heat spreaders 325-1 to 325-4 may be configured to conduct heat generated by the heat generating element 320 away from the second structure 310 and to the fourth structure 330. In other words, the heat spreaders 325-1 to 325-4 may be configured as an efficient heat transfer mechanism configured to reduce the heat at a hotspot generated by the heat generating element 320. The heat spreaders 325-1 to 325-4 may be a flexible, thermally conductive material (e.g., graphite or thin sheet of aluminum). The fourth structure 330 may be configured to dissipate the heat conducted to the fourth structure 330 by the heat spreaders 325-1 to 325-4. For example, the fourth structure 330 may be a back bone of a laptop computer. The back bone of a laptop computer may include vents (not shown) configured to dissipate heat.

Figure 3A:
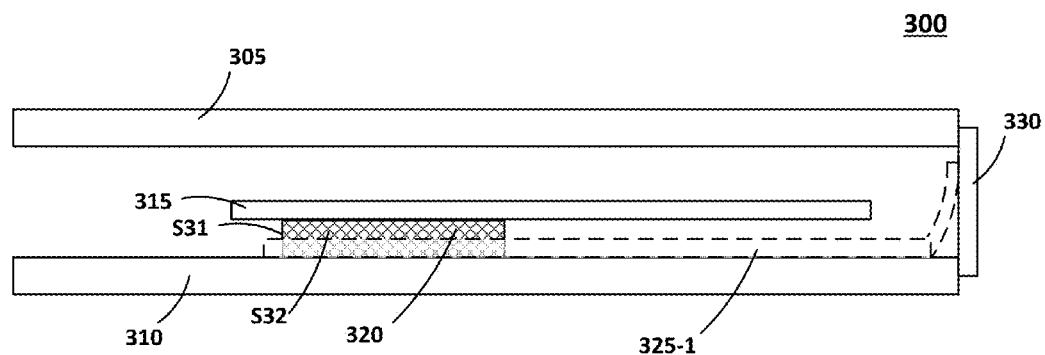
FIGS. 3A-3F illustrate block diagrams of further configurations of a heat spreader according to at least one example embodiment.

As shown in FIG. 3A, the heat spreader 325-1 may surround the heat generating element 320 such that the heat spreader 325-1 is in contact with or coupled to (or substantially in contact with or coupled to) more than one surface (e.g., S31 and S32) of the heat generating element 320. For example, if the heat generating element 320 is a rectangle, square, or cube the heat spreader 325-1 may be in contact with or coupled to (or substantially in contact with or coupled to) two or more sides (e.g., S31 and S32) of the heat generating element 320. For example, if the heat generating element 320 is a circle, oval or cylinder, the heat spreader 325-1 may be in contact with or coupled to (or substantially in contact with or coupled to) a significant portion of the circumference of the heat generating element 320. The heat spreader 325-1 may be coupled to the heat generating element 320, the second structure 320 and/or the fourth structure 330 using an adhesive (e.g., a thermally conductive glue/epoxy or thermally conductive tape) and/or a paste/grease (e.g., a thermally conductive paste/grease).

Figure 3B:
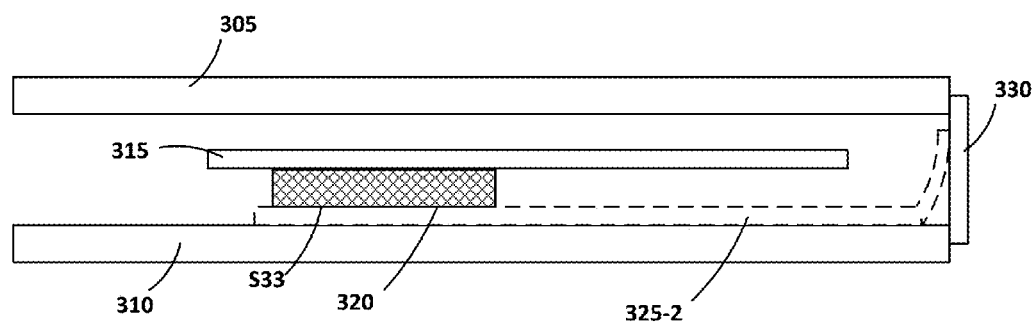

As shown in FIG. 3B, the heat spreader 325-2 may be between the generating element 320 and a surface (e.g. S33) of the second structure 310 such that the heat spreader 325-1 is in contact with or coupled to (or substantially in contact with or coupled to) one surface (e.g., a bottom surface S33) of the heat generating element 320. The heat spreader 325-2 may be in contact with an entire surface (e.g., S33) of the heat generating element 320 or a portion of the surface (e.g., S33) of the heat generating element 320. The heat spreader 325-2 may be coupled to the heat generating element 320, the second structure 310 and/or the fourth structure 330 using an adhesive (e.g., a thermally conductive glue/epoxy or thermally conductive tape) and/or a paste/grease (e.g., a thermally conductive paste/grease).

Figure 3C:
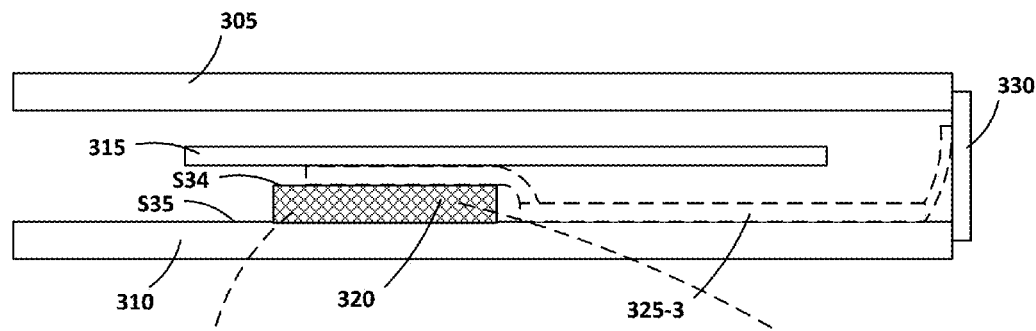
Figure 3E:
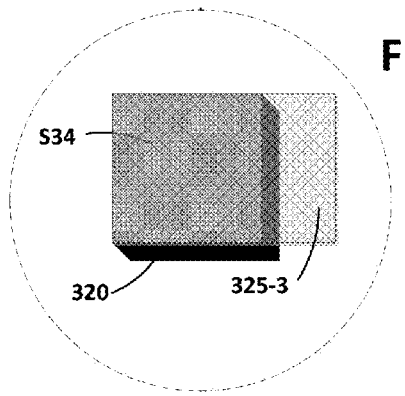
Figure 3F:
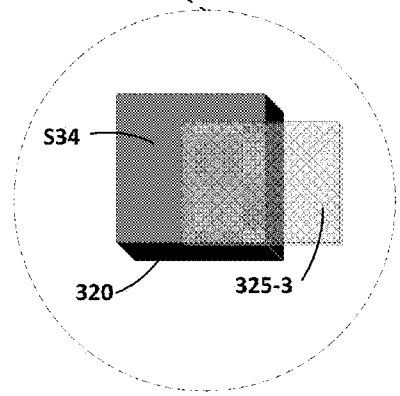
Figure 3D:
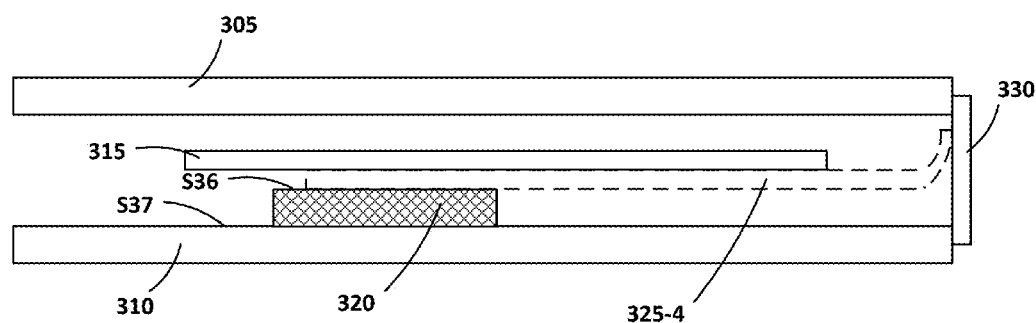

As shown in FIG. 3C, the heat spreader 325-3 may be on a surface (e.g., S34) of the generating element 320 that is opposite a surface (e.g., S35) of the second structure 310 such that the heat spreader 325-3 is in contact with or coupled to (or substantially in contact with or coupled to) one surface (e.g., a top surface S34) of the heat generating element 320. The heat spreader 325-3 may be in contact with an entire surface (e.g., S34) of the heat generating element 320, as shown in FIG. 3E, or a portion of the surface (e.g., S34) of the heat generating element 320, as shown in FIG. 3F. The heat spreader 325-3 may be coupled to the heat generating element 320, the second structure 310 and/or the fourth structure 330 using an adhesive (e.g., a thermally conductive glue/epoxy or thermally conductive tape) and/or a paste/grease (e.g., a thermally conductive paste/grease). The heat spreader 325-3 may traverse along (or substantially along) the second structure 310.

As shown in FIG. 3C, the heat spreader 325-4 may be on a surface (e.g., S36) of the generating element 320 that is opposite a surface (e.g., S37) of the second structure 310 such that the heat spreader 325-4 is in contact with or coupled to (or substantially in contact with or coupled to) one surface (e.g., a top surface S36) of the heat generating element 320. The heat spreader 325-4 may be in contact with an entire surface (e.g., S36) of the heat generating element 320 or a portion of the surface (e.g., S36) of the heat generating element 320. The heat spreader 325-4 may be coupled to the heat generating element 320, the third structure 315 and/or the fourth structure 330 using an adhesive (e.g., a thermally conductive glue/epoxy or thermally conductive tape) and/or a paste/grease (e.g., a thermally conductive paste/grease). The heat spreader 325-4 may traverse along (or substantially along) the third structure 315.

Figure 4A:
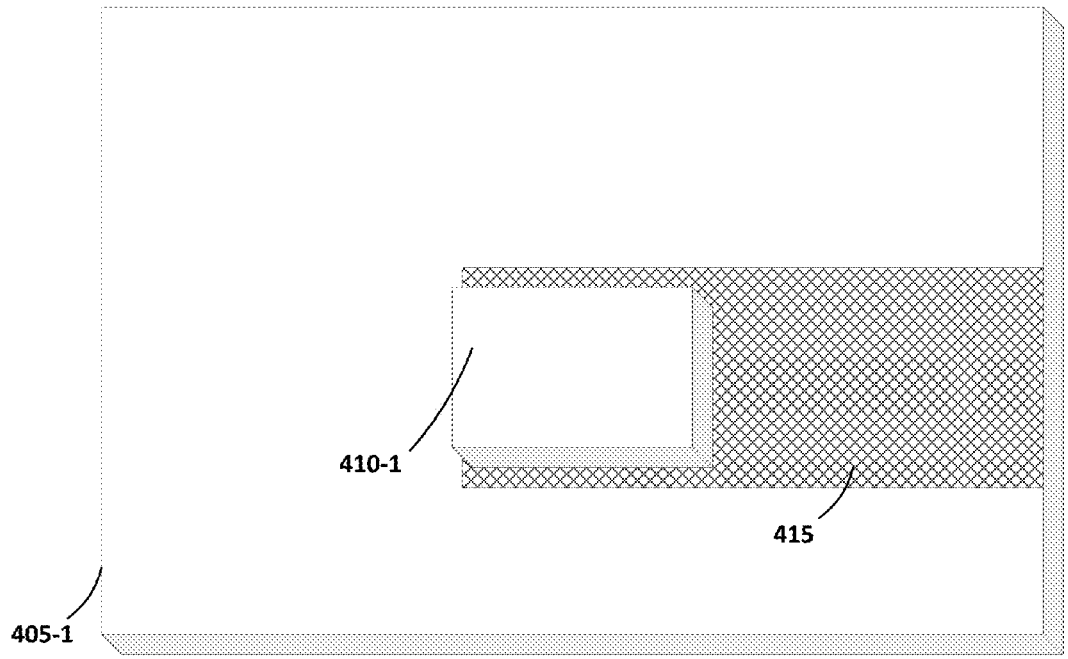
FIGS. 4A and 4B illustrate block diagrams of still further configurations of a heat spreader according to at least one example embodiment.
Figure 4B:
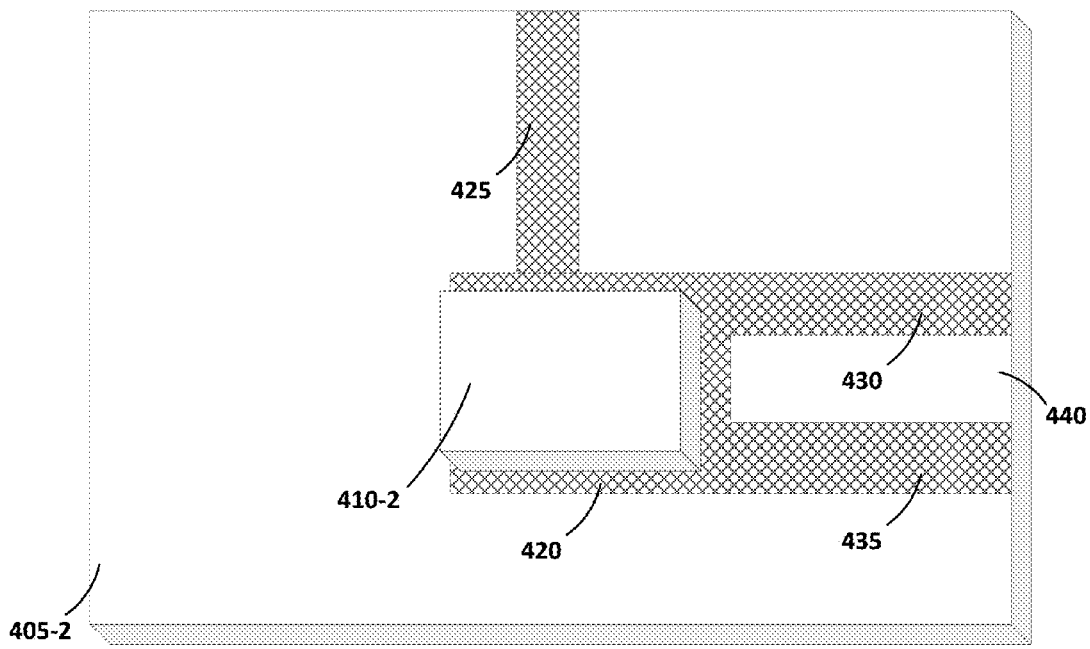

FIGS. 4A and 4B illustrate block diagrams of still further configurations of a heat spreader according to at least one example embodiment. As shown in FIGS. 4A and 4B, a computing device may include a first structure 405-1, 405-2, on which a heat generating element 410-1, 410-2 is coupled (or substantially in contact with). The first structure 405-1, 405-2 may be a frame, a circuit board, a heat sink, a base plate, and the like of a computing device. The heat generating element 410-1, 410-2 may generate a hotspot on the first structure 405-1, 405-2. As shown in FIG. 4A, a heat spreader 415 is a single sheet (or multiple sheets combined as a single sheet) conducting heat away from the heat generating element 410-1 in one (or substantially one) direction or along one (or substantially one) path to another structure (e.g., the third structure 330) that is thermally isolated (or substantially thermally isolated) from the first structure 405-1.

As shown in FIG. 4B, a heat spreader 420 includes heat spreader sub-elements 425, 430, 435 configured to conduct heat away from the heat generating element 410-2 in more than one direction or path. For example, heat spreader sub-elements 430 and 435 may conduct heat toward the back of the computing device to an isolated (or substantially thermally isolated) back structure, whereas heat spreader sub-element 425 may conduct heat toward a side of the computing device to an isolated (or substantially thermally isolated) side structure. Heat spreader 420 and heat spreader sub-elements 425, 430, 435 may be formed of a single sheet of heat spreader material cut in the necessary shape. Alternatively, or in addition to, heat spreader 420 and heat spreader sub-elements 425, 430, 435 may be formed of many pieces of heat spreader material assembled together using a thermally conductive adhesive. The heat spreader 420 and heat spreader sub-elements 425, 430, 435 may be constructed of a same or a different material. For example, heat spreader 420 may be aluminum and heat spreader sub-elements 425, 430, 435 may be graphite.

In between the heat spreader sub-elements 430 and 435 may be a thermal insulator section 440. For example, the thermal insulator section 440 may be a portion of the first structure 405-2. For example, the thermal insulator section 440 may be constructed of a same material (or substantially similar material) as the first structure 405-2. Alternatively, or in addition to, the thermal insulator section 440 may be constructed of a different material (or substantially dissimilar material) as the first structure 405-2. Further, the heat spreader sub-element 425 may be aligned along a longitudinal axis that is non-parallel to a longitudinal axis along which heat spreader sub-elements 430 and 435 are aligned. The surface area of each of the heat spreader 420 and the heat spreader sub-elements 425, 430, 435 may have different surface areas and thus may have different heat transfer capabilities (e.g., different heat transfer rates).

Figure 5:
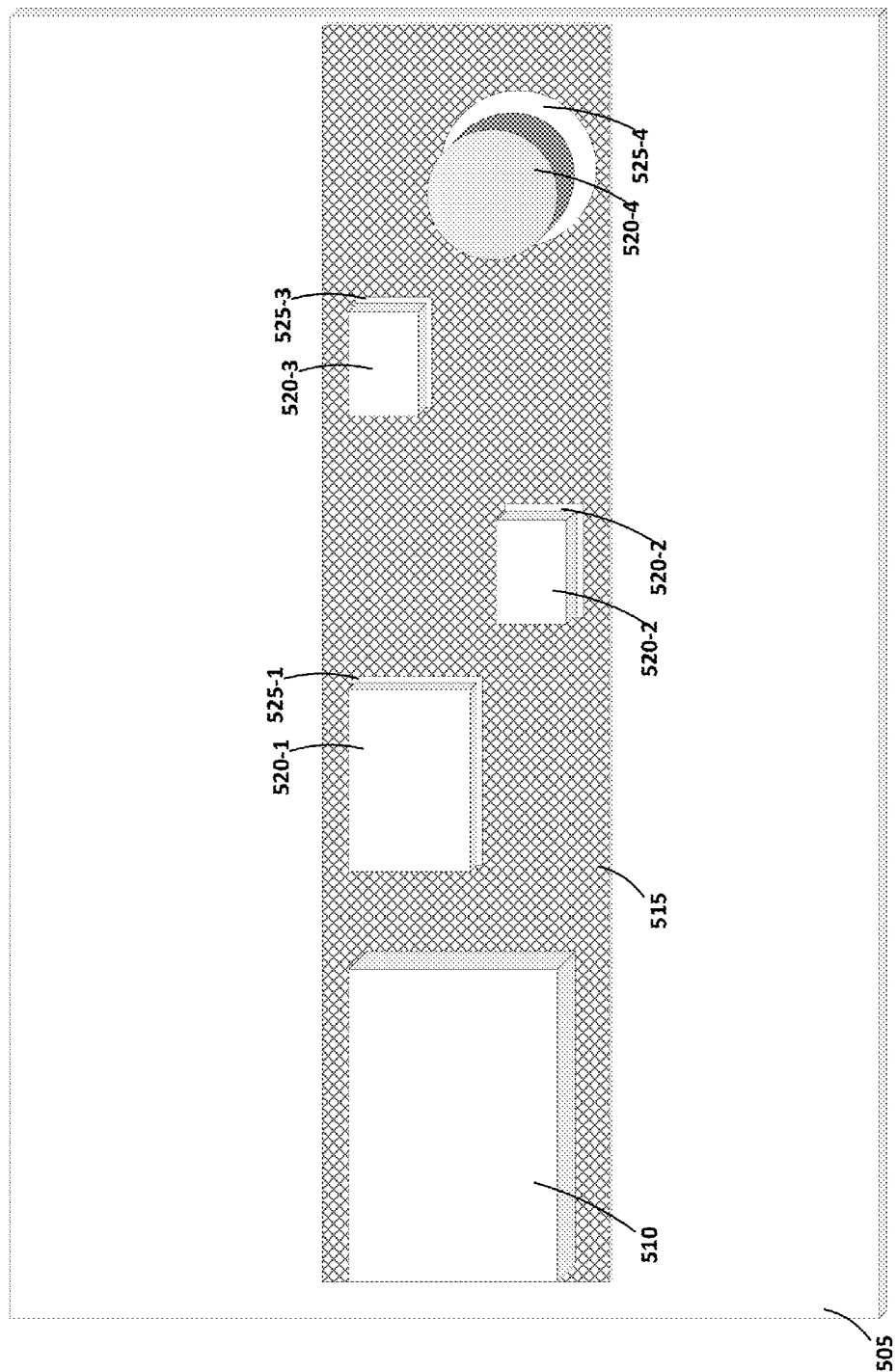
FIG. 5 illustrates a block diagram of another configuration of a heat spreader according to at least one example embodiment.

FIG. 5 illustrates a block diagram of another configuration of a heat spreader according to at least one example embodiment. As shown in FIG. 5, the computing device may include a first structure 505, a heat generating element 510, a plurality of other elements 520-1 to 520-4, and a heat spreader 515. The first structure 505 may be a frame, a circuit board, a heat sink, a base plate, and the like of a computing device. The heat generating element 510 may generate a hotspot on the first structure 505. The heat spreader 515 may be configured to conduct heat away from the heat generating element 510 to another structure (e.g., the third structure 330) that is thermally isolated (or substantially thermally isolated) from the first structure 505.

The heat spreader may include a plurality of cut-outs (or openings) 525-1 to 525-4. The plurality of cut-outs 525-1 to 525-4 may be configured to prevent heat conduction to or heat conduction from the plurality of other elements 520-1 to 520-4 to the heat spreader 515. In other words the plurality of other elements 520-1 to 520-4 may be thermally isolated (or substantially thermally isolated) from the heat spreader 515 by the plurality of cut-outs 525-1 to 525-4. The heat spreader 515 may conduct heat away from the heat generating element 510 without having an impact (or substantial impact) thermally on the plurality of other elements 520-1 to 520-4.

Figure 6A:
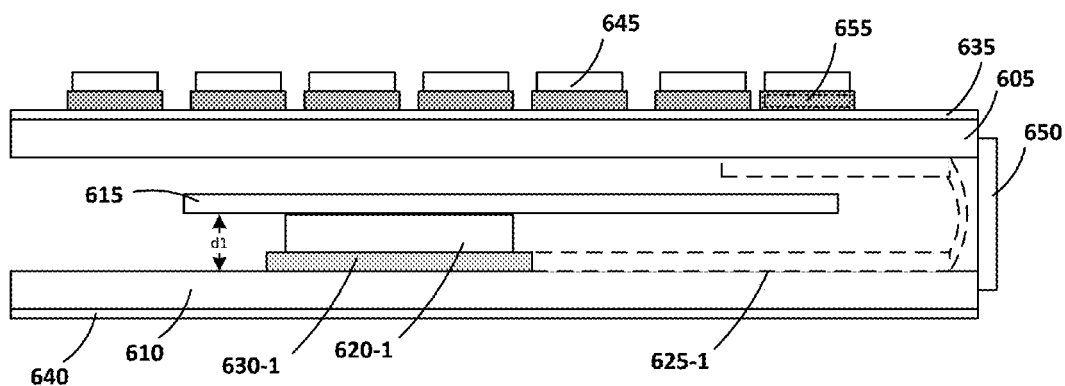
FIGS. 6A and 6B illustrate block diagrams of still more configurations of a heat spreader according to at least one example embodiment.
Figure 6B:
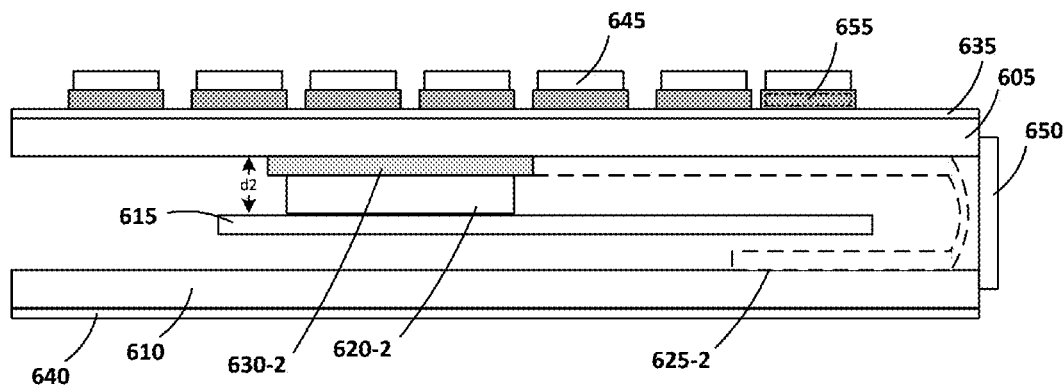

FIGS. 6A and 6B illustrate block diagrams of still more configurations of a heat spreader according to at least one example embodiment. As shown in FIGS. 6A and 6B, a computing device 600 includes a first structure 605, a second structure 610, a third structure 615, a fourth structure 650, a heat generating element 620-1, 620-2, a heat spreader 625-1, 625-2, a first casing 635, a second casing 640, a plurality of keys 645, and a thermal gap pad 630-1, 630-2.

The first structure 605, the second structure 610 and the fourth structure 650 may be thermally isolated (or substantially isolated) from each other. For example, heat generated on one of the structures (e.g., the second structure 610) may not be efficiently conducted to the other structures (e.g., the first structure 605 and the third structure 630) via any of the structures. The first casing 635 may be an outer shell of the computing device including, for example, a flexible structure (e.g., a web) configured to enable the keys 645 to depress when pressed or typed by a user. For example, the first casing 635 may be the outer shell of a laptop computer. The first casing 635 may be the outer shell associated with the keyboard of the laptop computer. The second casing 640 may be an outer shell of the computing device. For example, the second casing 640 may be the outer shell of a laptop computer. The second casing 640 may be the outer shell associated with the bottom (e.g., the portion that rests on a surface or user's lap during use) of the laptop computer.

The thermal gap pad 630-1, 630-2 may be configured to conduct heat from the heat generating element 620-1, 620-2 to the second structure 610 or the first structure 605. For example, the third structure 615 may be positioned such that a distance d1, d2 between the third structure 615 and the second structure 610 or the first structure 605 is greater than a width (or height depending on perspective) of the heat generating element 620-1, 620-2. The difference may form an air gap between the heat generating element 620-1, 620-2 and the second structure 610 or the first structure 605. The thermal gap pad 630-1, 630-2 may fill this air gap. The thermal gap pad 630-1, 630-2 may be formed of an elastic, thermally conductive material.

As shown in FIG. 6A, the heat generating element 620-1 may generate a hotspot on the second structure 610. The heat spreader 625-1 may be configured to conduct heat generated by the heat generating element 620-1 away from the second structure 610 and to the first structure 605. As shown in FIG. 6A, the heat may be conducted away from a bottom (e.g., the portion that rests on a surface or users' lap during use) of the computer device 600 (e.g., laptop), thus reducing hotspots on the bottom of the computing device 600. The plurality of keys 645 may be positioned on the first structure 605, the plurality of keys 645 may be formed of a first material (e.g., plastic) and each of the plurality of keys may including an air gap 655 under the surface of a key where a user presses. Further, the first structure 605 may be formed of a second material (e.g., aluminum or titanium), the second material may have a higher heat transfer coefficient than the first material. As a result, the first structure 605 may be configured to dissipate the heat in at least one of the air gaps 655.

As shown in FIG. 6B, the heat generating element 620-2 may generate a hotspot on the first structure 605. The heat spreader 625-2 may be configured to conduct heat generated by the heat generating element 620-2 away from the first structure 605 and to the second structure 610. As shown in FIG. 6B, the heat may be conducted away from a top (e.g., the portion associated with a keyboard) of the computer device 600 (e.g., laptop), thus reducing hotspots on the top of the computing device 600.

Figure 7:
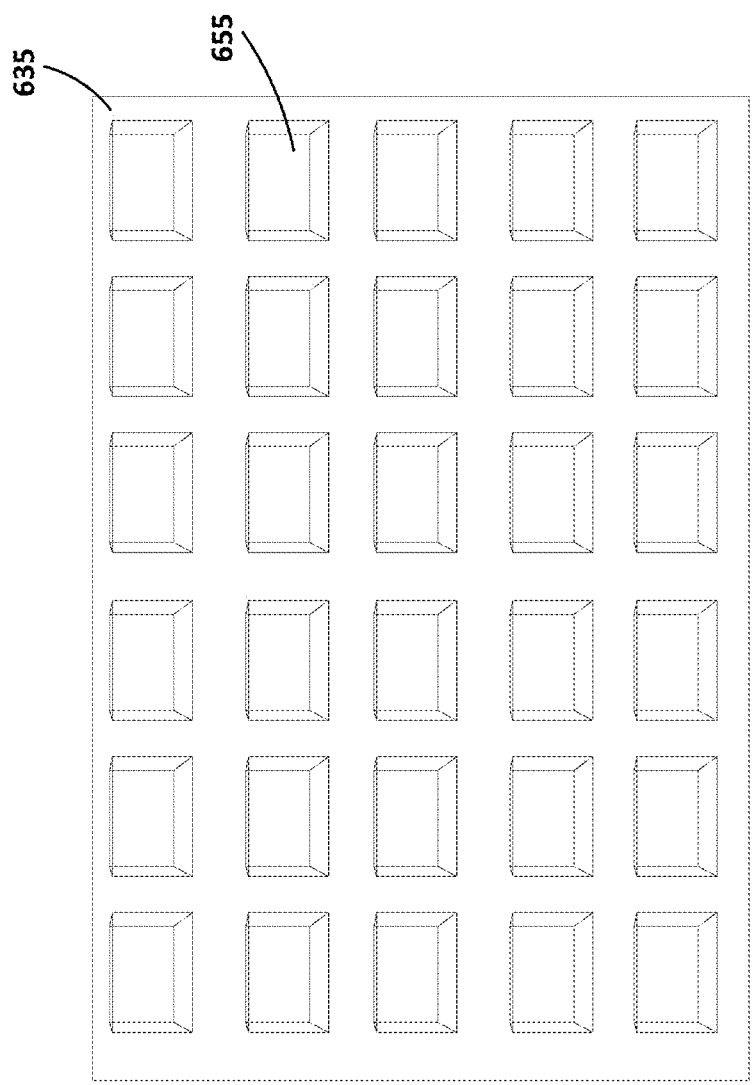
FIG. 7 illustrates a keyboard according to at least one example embodiment.

FIG. 7 illustrates a keyboard according to at least one example embodiment. The keyboard 700 may be on or associated with the first casing 635 as the outer shell associated with the keyboard of the laptop computer. The view of the keyboard 700 is from the underside (underneath or away from the surface of a key where a user presses). The keyboard 700 includes a plurality of air gaps 655. The plurality of air gaps 655, or a portion of the plurality of air gaps 655, may be configured to help dissipate heat as generated on or conducted to the first structure 605.

Figure 8:
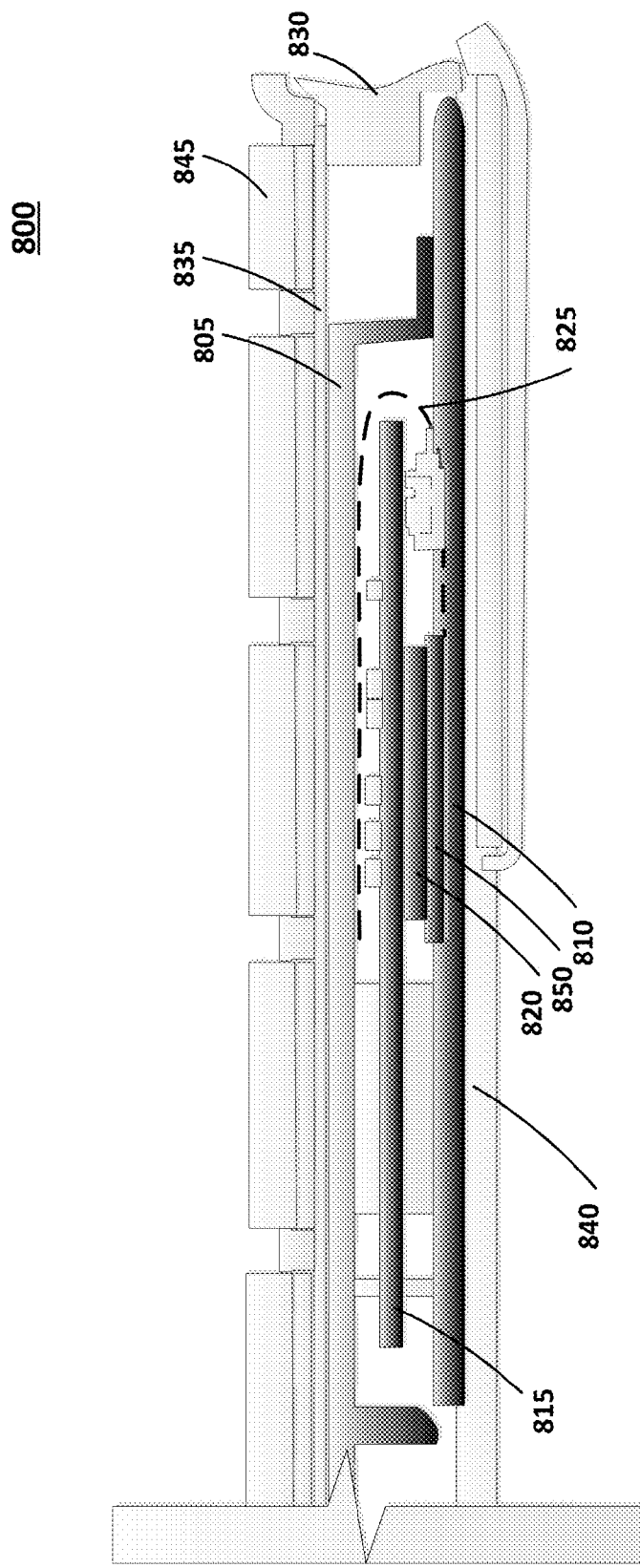
FIG. 8 illustrates a perspective view of another configuration of a heat spreader according to at least one example embodiment.

FIG. 8 illustrates a perspective view of another configuration of a heat spreader according to at least one example embodiment. As shown in FIG. 8, a computing device 800 (e.g., a laptop computer) includes a base frame 805, a bottom plate or heat sink 810, a circuit board 815, a backbone 830, a heat generating element 820, a heat spreader 825, a first casing 835, a second casing 840, a plurality of keys 845, and a thermal gap pad 850. The base frame 805 may be an element of a frame of the computing device 800. The bottom plate or heat sink 810 may be an element of the frame of the computing device 800. The backbone 830 may be an element of the frame of the computing device 800.

The base frame 805, the bottom plate or heat sink 810 and the backbone 830 may be thermally isolated (or substantially isolated) from each other. For example, heat generated on one of the structures (e.g., the bottom plate or heat sink 810) may not be efficiently conducted to the other structures (e.g., the base frame 805 and the backbone 830) via any of the structures. The first casing 835 may be an outer shell of the computing device 800. For example, the first casing 835 may be the outer shell of a laptop computer. The first casing 835 may be the outer shell associated with the keyboard of the laptop computer. The second casing 840 may be an outer shell of the computing device 800. For example, the second casing 840 may be the outer shell of a laptop computer. The second casing 840 may be the outer shell associated with the bottom (e.g., the portion that rests on a surface or users' lap during use) of the laptop computer.

As shown in FIG. 8, the heat generating element 820 may generate a hotspot on the bottom plate or heat sink 810. The heat spreader 825 may be configured to conduct heat generated by the heat generating element 620-1 away from the bottom plate or heat sink 810 and to the base frame 805. As shown in FIG. 8, the heat may be conducted away from a bottom (e.g., the portion that rests on a surface or users' lap during use) of the computer device 800 (e.g., laptop), thus reducing hotspots on the bottom of the computing device 800. The plurality of keys 845 may be positioned on the base frame 805, the plurality of keys 845 may be formed of a first material (e.g., plastic) and each of the plurality of keys 845 may including an air gap under the surface of a key where a user presses. Further, the base frame 805 may be formed of a second material (e.g., aluminum or titanium), the second material may have a higher heat transfer coefficient than the first material. As a result, the base frame 805 may be configured to dissipate the heat in at least one of the air gaps.

According to example embodiments, the base frame 805 and/or the bottom plate or heat sink 810 may be formed of aluminum having a thermal conductivity of, for example, 143 $Wm^{-1}C^{-1}$ or titanium having a thermal conductivity of, for example, 15.6 $Wm^{-1}C^{-1}$ or some other high (or relatively high) thermal conductivity material. The heat spreader 825 may be formed of aluminum as well as graphite having a thermal conductivity range of, for example, 200-500 $Wm^{-1}C^{-1}$ or copper having a thermal conductivity of, for example, 230 $Wm^{-1}C^{-1}$ or some other high (or relatively high) thermal conductivity material. The thermal gap pad 850 may be formed of silver loaded silicon having a thermal conductivity range of, for example, 1-5 $Wm^{-1}C^{-1}$. The circuit board 815 may be formed of (or include a substrate formed of) bakelite having a thermal conductivity of, for example, about $3 \times 10^{-4}$ $Wm^{-1}C^{-1}$. The plurality of keys 845 may be formed of (or in part formed of) plastic having a thermal conductivity of, for example, about $1 \times 10^{-1}$ $Wm^{-1}C^{-1}$. In other words, the base frame 805 and/or the bottom plate or heat sink 810 and the thermal gap pad 850 may be formed of a thermally conductive material as compared to the circuit board 815 and the plurality of keys 845.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A computing device, comprising:
an enclosure including a first structure, a second structure aligned parallel to the first structure and a third structure disposed between the first structure and the second structure, the third structure including a thermally non-conductive material;
a first element and a second element each in contact with the third structure, the first element being a processor and the second element being a non-processor element; and
a flexible sheet including:
a first portion having a first surface in contact with at least one of a surface of the first element and a thermally conductive material in contact with the surface of the first element and the first portion having a second surface in contact with at least one of a surface of the second structure and the thermally conductive material in contact with the surface of the second structure,
a second portion positioned substantially perpendicular to the third structure, and
a third portion in contact with a surface of the first structure and substantially parallel to the first portion, the flexible sheet configured to conduct heat generated by the first element away from the first structure and to a surface of the second structure, the flexible sheet including a cutout through which the second element is inserted.

2. The computing device of claim 1, further comprising:
a plurality of keys positioned on the second structure, the plurality of keys each defining an air gap configured to dissipate the heat, wherein
the second structure and the plurality of keys are positioned with respect to one another such that the heat is dissipated from the second structure into the air gaps defined by the plurality of keys.

3. The computing device of claim 1, further comprising:
a plurality of keys positioned on the second structure, the plurality of keys formed of a first material and each of the plurality of keys defining an air gap, wherein
the second structure is formed of a second material, the second material having a higher heat transfer coefficient than the first material, wherein
the second structure and the plurality of keys are positioned with respect to one another such that the heat is dissipated from the second structure into the air gaps defined by the plurality of keys.

4. The computing device of claim 1, wherein
the thermally conductive material is a thermal gap pad configured to conduct heat generated by the first element to the first structure, and
the flexible sheet is in contact with the thermal gap pad.

5. The computing device of claim 1, wherein
the first structure is a baseframe of the computing device configured to support a keyboard, and
the second structure is a bottom plate of the computing device.

6. The computing device of claim 1, wherein
the second structure is a baseframe of the computing device configured to support a keyboard, and
the first structure is a bottom plate of the computing device.

7. The computing device of claim 1, wherein the flexible sheet includes:
a first heat spreader element aligned along a first longitudinal axis; and
a second heat spreader element aligned along a second longitudinal axis non-parallel to the first longitudinal axis.

8. The computing device of claim 1, wherein the flexible sheet includes a woven sheet of graphite strands.

9. The computing device of claim 1, wherein the flexible sheet includes bonded graphite fiber.

10. The computing device of claim 1, wherein the flexible sheet includes bonded graphite flakes.

11. A computing device, comprising:
an enclosure including a first structure, a second structure aligned parallel to the first structure, a third structure disposed between the first structure and the second structure, the third structure including a thermally non-conductive material, and a fourth structure aligned substantially perpendicular to the first structure;
a first element and a second element each in contact with the third structure, the first element being a processor and the second element being a non-processor element; and
a flexible sheet including:
a first portion having a first surface in contact with at least one of a surface of the first element and a thermally conductive material in contact with the surface of the first element and the first portion having a second surface in contact with at least one of a surface of the second structure and the thermally conductive material in contact with the surface of the second structure,
a second portion positioned on surface of the second structure, substantially parallel to the third structure, and
a third portion in contact with the fourth structure and substantially perpendicular to the first portion, the flexible sheet being configured to conduct heat generated by the first element away from the first structure and to a surface of the fourth structure configured to dissipate heat, the flexible sheet including a cutout through which the second heat generating element is inserted.

12. The computing device of claim 11, wherein
the thermally conductive material is a thermal gap pad configured to conduct heat generated by the first element to the first structure, and
the flexible sheet is in contact with the thermal gap pad.

13. The computing device of claim 11, wherein
the first structure is a baseframe of the computing device configured to support a keyboard,
the second structure is a bottom plate of the computing device, and
the fourth structure is a back bone of the computing device.

14. The computing device of claim 11, wherein
the second structure is a baseframe of the computing device configured to support a keyboard,
the first structure is a bottom plate of the computing device, and
the fourth structure is a back bone of the computing device.

15. The computing device of claim 11, wherein the flexible sheet includes:

a first heat spreader element aligned along a first longitudinal axis; and a second heat spreader element aligned along a second longitudinal axis non-parallel to the first longitudinal axis.

16. The computing device of claim 11, wherein the flexible sheet includes a woven sheet of graphite strands.

17. The computing device of claim 11, wherein the flexible sheet includes bonded graphite fiber.

18. The computing device of claim 11, wherein the flexible sheet includes bonded graphite flakes.

* * * * *